United States Patent
Lee

(10) Patent No.: US 10,156,604 B2
(45) Date of Patent: Dec. 18, 2018

(54) SEMICONDUCTOR APPARATUS AND METHOD OF OPERATING THE SAME

(71) Applicant: SAMSUNG ELECTRONICS CO., LTD., Suwon-si, Gyeonggi-do (KR)

(72) Inventor: Sang-Woo Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 388 days.

(21) Appl. No.: 14/995,777

(22) Filed: Jan. 14, 2016

(65) Prior Publication Data

US 2016/0216326 A1 Jul. 28, 2016

(30) Foreign Application Priority Data

Jan. 26, 2015 (KR) .................. 10-2015-0012313

(51) Int. Cl.
*G01R 31/317* (2006.01)
*G06F 21/74* (2013.01)
*G06F 21/70* (2013.01)
*G06F 21/71* (2013.01)

(52) U.S. Cl.
CPC ....... *G01R 31/31719* (2013.01); *G06F 21/74* (2013.01); *G06F 21/70* (2013.01); *G06F 21/71* (2013.01)

(58) Field of Classification Search
CPC .......... G06F 21/70; G06F 21/71; G06F 21/74; G01R 31/31719
See application file for complete search history.

(56) References Cited

U.S. PATENT DOCUMENTS

| | | | |
|---|---|---|---|
| 7,266,848 B2 | 9/2007 | Moyer et al. | |
| 7,886,150 B2 | 2/2011 | Stollon et al. | |
| 7,930,537 B2 | 4/2011 | Paatero | |
| 8,042,173 B2 | 10/2011 | Sesumi | |
| 8,255,700 B2 | 8/2012 | Kitariev et al. | |
| 8,379,861 B2 | 2/2013 | Akselrod et al. | |
| 8,489,888 B2 | 7/2013 | Lim | |
| 8,621,298 B2 | 12/2013 | Son et al. | |
| 2008/0052532 A1* | 2/2008 | Akkar ................ | G06F 9/3004 713/189 |
| 2009/0204823 A1 | 8/2009 | Giordano et al. | |
| 2009/0228711 A1* | 9/2009 | Lim ..................... | G06F 21/575 713/182 |

(Continued)

*Primary Examiner* — Ayoub Alata
(74) *Attorney, Agent, or Firm* — Volentine, Whitt & Francos, PLLC

(57) ABSTRACT

A semiconductor apparatus includes a debugging processor that performs a debugging operation related to at least one selected intellectual property (IP) block from among a plurality of IP blocks. The debugging processor includes a debugging executing unit, a secure mode setting unit, and a debugging secure unit. The debugging executing unit disables a secure mode in response to a first control signal having a first value and performs the debugging operation related to the at least one selected IP block based on input data. The secure mode setting unit generates, in response to a second control signal, an enable signal for instructing re-enabling of the secure mode regardless of whether the semiconductor apparatus is powered off. The debugging secure unit generates the first control signal having the first value when the input data is verified data.

20 Claims, 13 Drawing Sheets

(56) References Cited

U.S. PATENT DOCUMENTS

2012/0060067 A1    3/2012   Youm et al.
2012/0079332 A1*   3/2012   Doumenjou ..... G01R 31/31719
                                                                     714/726

* cited by examiner

US 10,156,604 B2

SEMICONDUCTOR APPARATUS AND METHOD OF OPERATING THE SAME

CROSS-REFERENCE TO RELATED APPLICATION

A claim of priority under 35 U.S.C. § 119 is made to Korean Patent Application No. 10-2015-0012313, filed on Jan. 26, 2015, in the Korean Intellectual Property Office, the disclosure of which is incorporated herein in its entirety by reference.

BACKGROUND

The inventive concept relates to a semiconductor apparatus and to a method of operating a semiconductor apparatus, and more particularly, to security aspects of a semiconductor apparatus and to security aspects of a method of operating a semiconductor apparatus.

Security concerns are becoming increasingly relevant in the field of semiconductor apparatuses (i.e., devices). For example, security may be compromised when semiconductor apparatuses are debugged through a semiconductor apparatus access interface.

SUMMARY

An exemplary embodiment of the inventive concept provides a semiconductor apparatus including a plurality of intellectual property (IP) blocks, and a debugging processor configured to perform a debugging operation related to at least one IP block selected from among the plurality of IP blocks. The debugging processor includes a debugging executing unit and a secure mode setting unit. The debugging executing unit is configured to disable a secure mode if input data is verified data, and to perform the debugging operation related to the at least one IP block based on the input data. The secure mode setting unit is configured to generate an enable signal for instructing re-enabling of the secure mode regardless of whether the semiconductor apparatus is powered off.

An exemplary embodiment of the inventive concept provides a semiconductor apparatus including a plurality of IP blocks, and a Joint Test Action Group (JTAG) port configured to perform a debugging operation related to at least one IP block selected from the plurality of IP blocks. The JTAG port includes a JTAG controller configured to disable a secure mode in response to a first control signal having a first value and perform the debugging operation related to the at least one IP block based on input data, and a JTAG security unit configured to generate the first control signal having the first value when the input data is verified data, and generate the first control signal having a second value, which is different from the first value, before the semiconductor apparatus is powered off after the secure mode is disabled.

An exemplary embodiment of the inventive concept provides a method of operating a semiconductor apparatus. The method includes operating in a secure mode, inputting input data via a JTAG interface, determining whether the input data is verified input data, disabling the secure mode when the input data is the verified input data and performing a debugging operation related to at least one IP block selected from a plurality of IP blocks based on the input data, and re-enabling the secure mode before the semiconductor apparatus is powered off.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
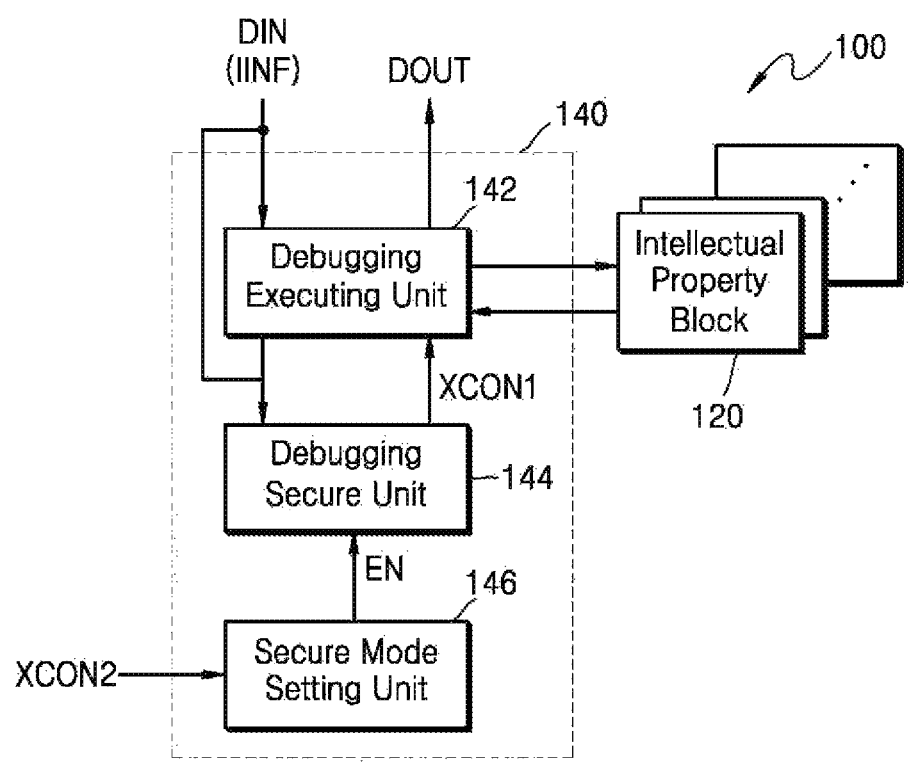
FIG. 1 is a block diagram of a semiconductor apparatus according to an exemplary embodiment.

The inventive concept now will be described more fully hereinafter with reference to the accompanying drawings, wherein like reference numerals refer to like elements throughout. The term "and/or" includes any and all combinations of one or more of the associated listed items. Expressions such as "at least one of," when preceding a list of elements, modify the entire list of elements and do not modify the individual elements of the list.

As is traditional in the field of the inventive concepts, embodiments are described and illustrated in terms of functional blocks and units. These blocks and units are physically implemented by electronic circuits such as logic circuits, microprocessors, hard-wired circuits or the like, and may optionally be driven by firmware and/or software. Also, each functional block and unit of the embodiments may be physically separated into two or more interacting and discrete blocks or units without departing from the scope of the inventive concepts. Likewise, the functional blocks and units of the embodiments may be physically combined into more complex blocks or units without departing from the scope of the inventive concepts.

FIG. 1 is a block diagram of a semiconductor apparatus 100 according to an exemplary embodiment. Referring to FIG. 1, the semiconductor apparatus 100 may include a plurality of intellectual property (IP) blocks 120 and a debugging processor 140 that debugs one or more of the plurality of IP blocks 120. The debugging processor 140 may include a debugging executing unit 142, a debugging security unit 144, and a secure mode setting unit 146.

The debugging executing unit 142 may respond to a first control signal XCON1 having a first value and perform a debugging operation related to one or more of the plurality of IP blocks 120 based on input data IDTA received by the semiconductor apparatus 100. A program code error or hardware malfunctioning may occur in each of the plurality of IP blocks 120 in the semiconductor apparatus 100. The debugging executing unit 142 may perform a debugging operation, such as error finding, error correcting, or resetting, by executing the input data IDTA input from an external test apparatus or a debugging apparatus in which the plurality of IP blocks 120 are verified. A result RST obtained when the input data IDTA executed in at least one of the plurality of IP blocks 120 may be output as output data ODTA.

The debugging security unit 144 determines whether the input data IDTA is verified data by analyzing identification information IINF that is inputted together with the input data IDTA or separately inputted. The input data IDTA and the identification information IINF may be directly input to the debugging security unit 144, or input via the debugging executing unit 142 to the debugging security unit 144. The term "verified data" refers to data transferred from an apparatus in which the input data IDTA is verified. When the input data IDTA is verified data, the debugging security unit 144 may disable a secure mode and output the first control signal XCON1 having the first value.

The first control signal XCON1 having the first value is transmitted to the debugging executing unit 142. The debugging executing unit 142 performs debugging only when the first control signal XCON1 is applied as the first value. When the debugging processor 140 or the semiconductor apparatus 100 is set to a secure mode, that is, when the first control signal XCON1 does not have the first value, the debugging executing unit 142 may output the output data ODTA having a null value.

In a state where the secure mode is disabled, i.e., in a non-secure mode where the debugging executing unit 142 may output the output data ODTA that corresponds to the input data IDTA, the secure mode setting unit 146 may re-enable the secure mode. In response to a second control signal XCON2, the secure mode setting unit 146 may transmit an enable signal EN, which instructs the debugging security unit 144 to generate a first control signal XCON1 having a second value, to the debugging security unit 144. An example in which the second control signal XCON2 is an input to the secure mode setting unit 146 will be described in detail below.

In response to the enable signal EN, the debugging security unit 144 may transmit the first control signal XCON1 having the second value to the debugging executing unit 142. The debugging executing unit 142 may operate in the secure mode in response to the first control signal XCON1 having the second value. For example, in the secure mode, the debugging executing unit 142 may output the output data ODTA having a null value. Accordingly, according to an exemplary embodiment, even when the semiconductor apparatus 100 is not powered off after the secure mode is disabled, the semiconductor apparatus 100 may re-enable the secure mode to block a non-verified apparatus from accessing the semiconductor apparatus 100 via the debugging processor 140.

Figure 2:
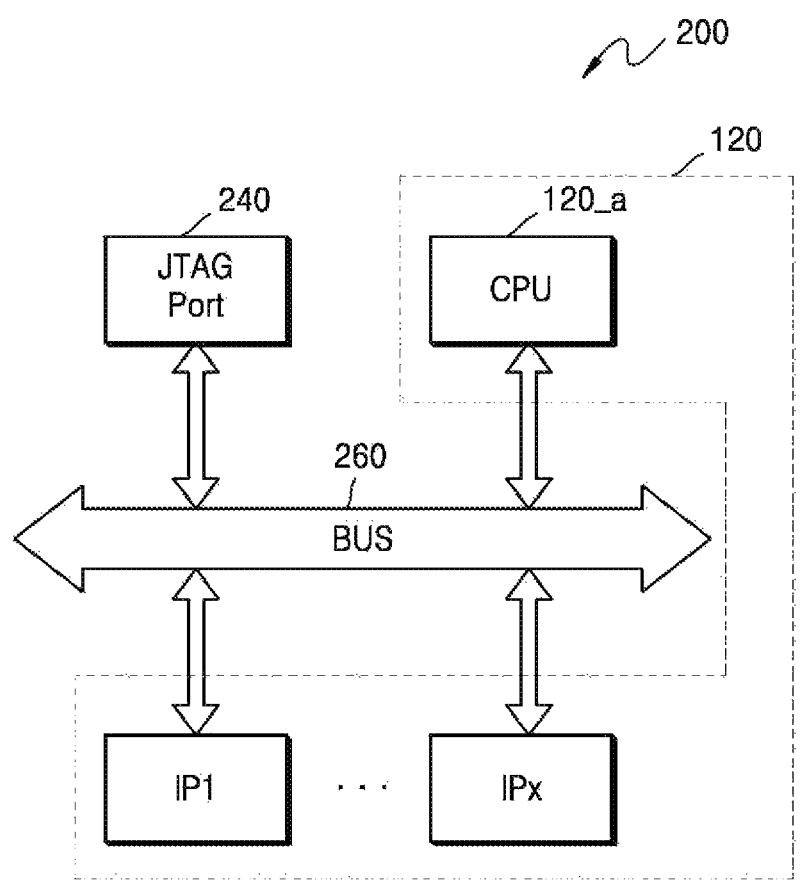
FIGS. 2 to 4 are block diagrams of semiconductor apparatuses according exemplary embodiments.
Figure 3:
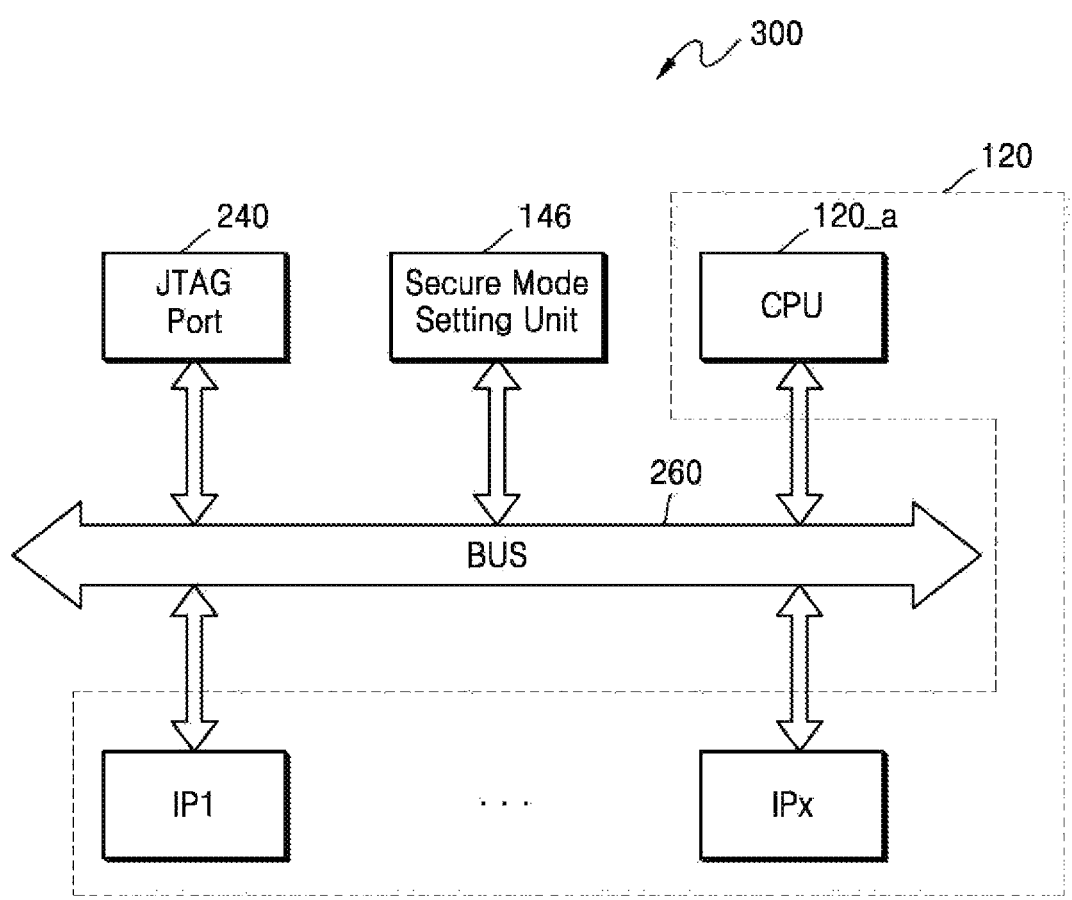

FIGS. 2 and 3 are block diagrams of a semiconductor apparatus according to exemplary embodiments, respectively. Referring to FIGS. 1 and 2, the semiconductor apparatus 100 of FIG. 1 may be provided as a system on chip (SoC) 200. One of the plurality of IP blocks 120 may be provided as a central processing unit (CPU) 120_a. The debugging processor 140 of FIG. 1 may be provided as a Joint Test Action Group (JTAG) port 240. The JTAG port 240 may be electrically connected to the plurality of IP blocks 120 via a bus 260. The JTAG port 240 may include the debugging executing unit 142, the debugging security unit 144, and the secure mode setting unit 146 of FIG. 1. The debugging executing unit 142 may include boundary scan cells and use input data IDTA that is input via a JTAG interface or a JTAG protocol so as to artificially perform operations of the CPU 120_a via the boundary scan cells in the non-secure mode, and thus perform a debugging operation related to the CPU 120_a or other IP blocks IP1 to IPx.

The debugging security unit 144 determines whether the input data IDTA is verified data, transmits the first control signal XCON1 having the first value to the debugging executing unit 142 when the input data IDTA is the verified data, and disables the secure mode. In response to the second control signal XCON2, the secure mode setting unit 146 change the non-secure mode to the secure mode. However, like a SOC 300 of FIG. 3, the secure mode setting unit 146 may not be included in the JTAG port 240 and located outside the JTAG port 240. Alternatively, the secure mode setting unit 146 may be included in a register in the CPU 120_a.

Figure 4:
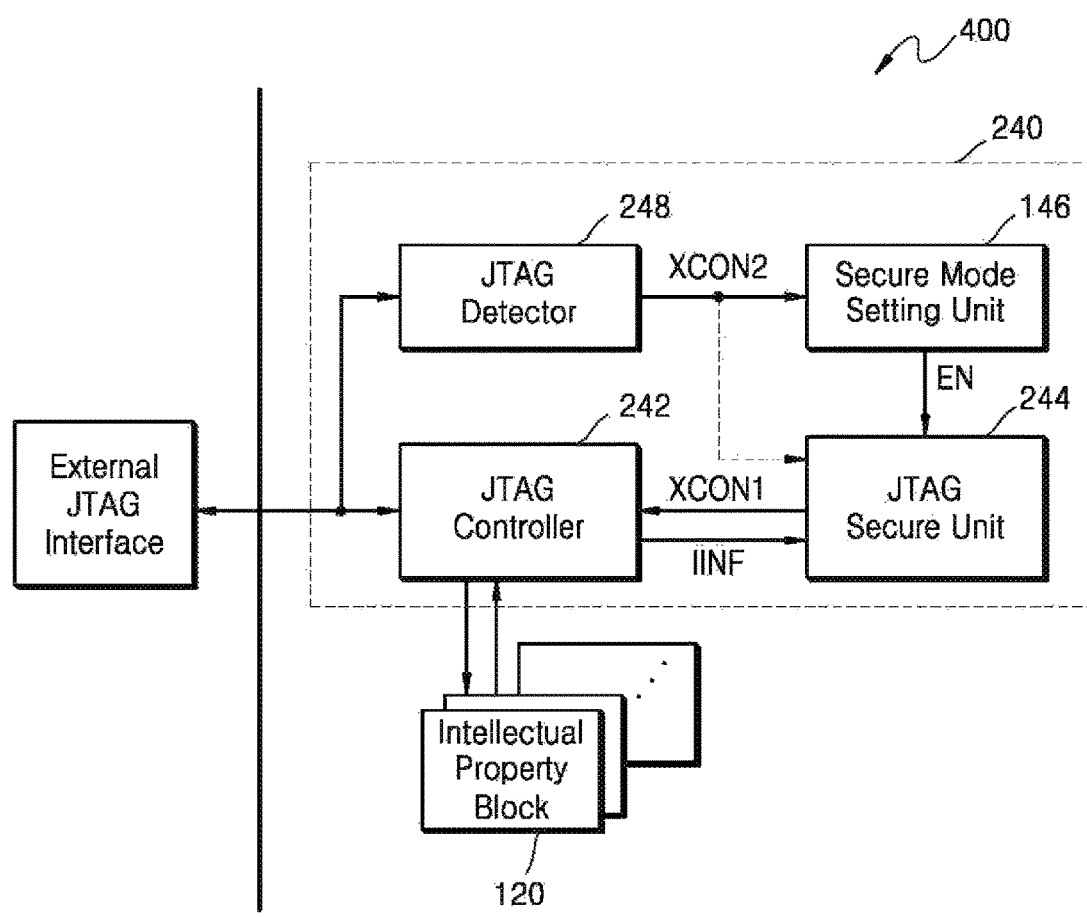

FIG. 4 is a block diagram of a semiconductor apparatus according an exemplary embodiment. Referring to FIGS. 1 and 4, the semiconductor apparatus 100 of FIG. 1 may be provided as a SOC 400 as in FIGS. 2 and 3, and the debugging processor 140 may be provided as the JTAG port 240. The JTAG port 240 may include a JTAG controller 242, a JTAG security unit 244, the secure mode setting unit 146, and a JTAG detector 248.

The JTAG controller 242, the JTAG security unit 244, and the secure mode setting unit 146 may perform similar operations as the debugging executing unit 142, the debugging security unit 144, and the secure mode setting unit 146, respectively. The JTAG controller 242 perform a debugging operation related to at least one selected from the plurality of IP blocks 120 by using the input data IDTA that is input from an external JTAG interface. The external JTAG interface is included in an external test apparatus or an external debugging apparatus.

The JTAG security unit 244 may determine whether to disable a secure mode by analyzing identification information IINF that is inputted together with the input data IDTA or separately inputted. Although FIG. 4 illustrates that the identification information IINF is input to the JTAG security unit 244 via the JTAG controller 242, exemplary embodiments are not limited thereto. The identification information IINF may be directly input to the JTAG security unit 244. In the secure mode, the JTAG controller 242 may output output data ODTA that corresponds to the input data IDTA as a null value, and in the non-secure mode, may output an execution result RST of the input data IDTA in at least one of the plurality of IP blocks 120 as the output data ODTA.

After the secure mode related to the SOC 400 or the JTAG port 240 is disabled, the secure mode setting unit 146 may re-enable the secure mode in response to the second control signal XCON2. The second control signal XCON2 may be generated by the JTAG detector 248. The JTAG detector 248 may detect whether an external JTAG interface is connected with the SOC 400 based on a state signal XST and generate the second control signal XCON2. The state signal XST may indicate the connection state between the external JTAG interface and the SOC 400. The state signal XST may be a test mode selection signal or a test clock signal of FIG. 5.

For example, when the external JTAG interface is disconnected from the SOC 400, the JTAG detector 248 may generate a second control signal XCON2 and transmit the second control signal XCON2 to the secure mode setting unit 146. The secure mode setting unit 146 may transmit an enable signal EN to the JTAG security unit 244, in response to the second control signal XCON2. The JTAG security unit 244 may transmit the first control signal XCON1 having the second value to the JTAG controller 242, in response to the enable signal EN. The JTAG controller 242 may output the output data ODTA as a null value, in response to the first control signal XCON1 having the second value. Therefore, when a verified external JTAG interface is disconnected from the SOC 400, the secure mode may be re-enabled in the SOC 400, and thus, security may be maintained.

Figure 5:
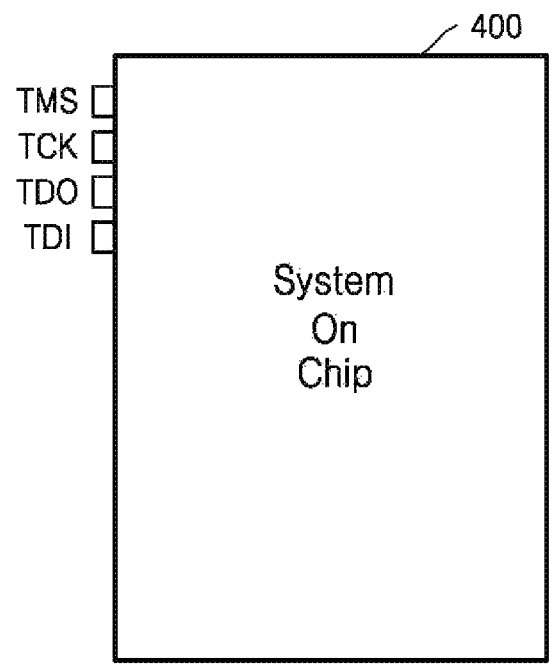
FIG. 5 is a diagram of a Joint Test Action Group (JTAG) interface according to an exemplary embodiment.

FIG. 5 is a diagram of a JTAG interface according to an exemplary embodiment. Referring to FIGS. 4 and 5, the SOC 400 may include four terminals for connecting to an external JTAG interface. For example, in order to connect to the JTAG interface, the SOC 400 may include a test mode selection signal reception terminal TMS, a test clock signal reception terminal TCK, a test data output terminal TDO, and a test data input terminal TDI. When signals are inputted via the test mode selection signal reception terminal TMS and the test clock signal reception terminal TCK, the JTAG detector 248 may detect a connection with the external JTAG interface. The JTAG detector 248 may detect whether the SOC 400 is connected with the external JTAG interface when signals are continuously inputted via the test clock signal reception terminal TCK and also detect whether the SOC 400 is disconnected from the external JTAG interface when signals are not input via the test clock signal reception terminal TCK. When the external JTAG interface is connected, the test result may be transmitted by the test data output terminal TDO and the test data may be inputted to the test data input terminal TDI. The output data ODTA and the input data IDTA may be the test result and the test data, respectively.

Figure 6:
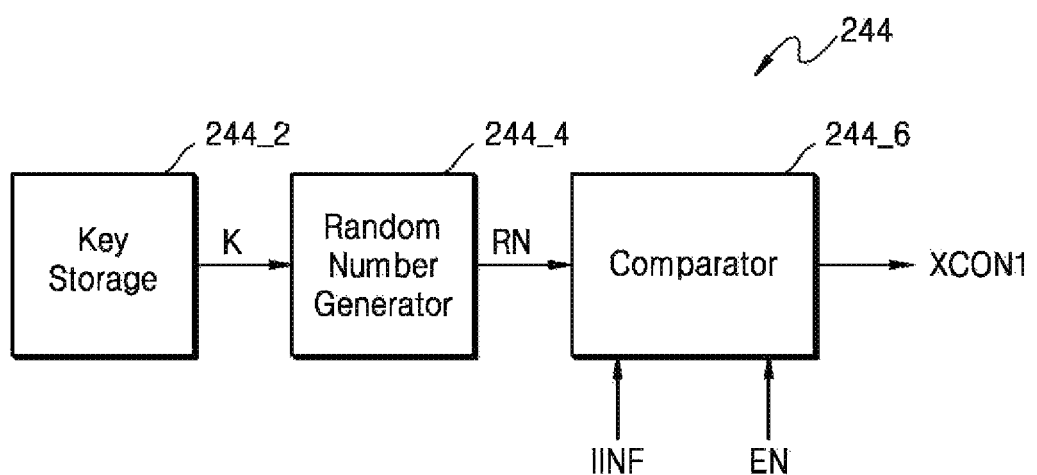
FIG. 6 is a block diagram of a JTAG security unit according to an exemplary embodiment.

FIG. 6 is a block diagram of a JTAG security unit according to an exemplary embodiment. Referring to FIG. 6, the JTAG security unit 244 may include a key storage 244_2, a random number generator 244_4, and a comparator 244_6. The key storage 244_2 may store a cryptographic key K, and the random number generator 244_4 generates a random number RN by using the cryptographic key K that is transmitted from the key storage 244_2. The comparator 244_6 may compare the random number RN and the identification information IINF, and when the random number RN and the identification information IINF are the same, the comparator 244_6 may output a first control signal XCON1 having a first value. The JTAG security unit 244 may include another cryptographic engine instead of the random number generator 244_4. As described above, the operation may be performed when the JTAG detector 248 of FIG. 4 transmits a second control signal XCON2 having a second value which indicates that the external JTAG interface is connected with the semiconductor apparatus 100.

Additionally, the comparator 244_6 may output a first control signal XCON1 having a second value in response to an enable signal EN. For example, the comparator 244_6 may output the first control signal XCON1 having the second value regardless of whether the random number RN is the same as the identification information IINF. Therefore, the semiconductor apparatus 100 may be changed from the non-secure mode to the secure mode without being power off. Thus, when the semiconductor apparatus 100 (or the SOC 200, 300, 400) is not powered off even if a JTAG interface is disabled, there is a lower risk of a connection with a non-verified apparatus because the semiconductor apparatus 100 maintains a non-secure mode. Although FIG. 6 illustrates that the enable signal EN is inputted to the comparator 244_6, exemplary embodiments are not limited thereto. The enable signal EN may be applied to the key storage 244_2, the random number generator 244_4, and the comparator 244_6.

Figure 7:
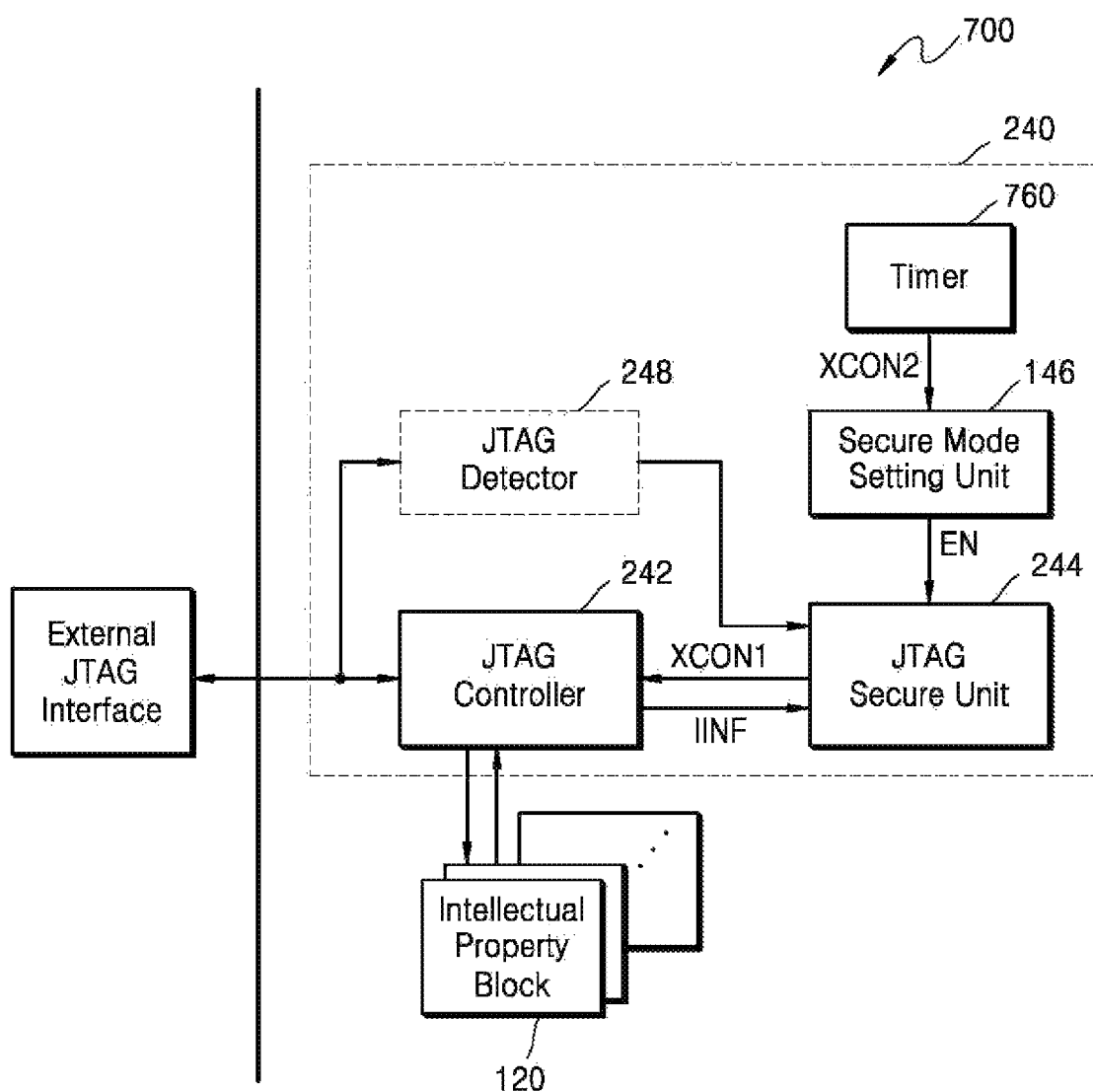
FIGS. 7 and 8 are block diagrams of semiconductor apparatuses according to exemplary embodiments.
Figure 8:
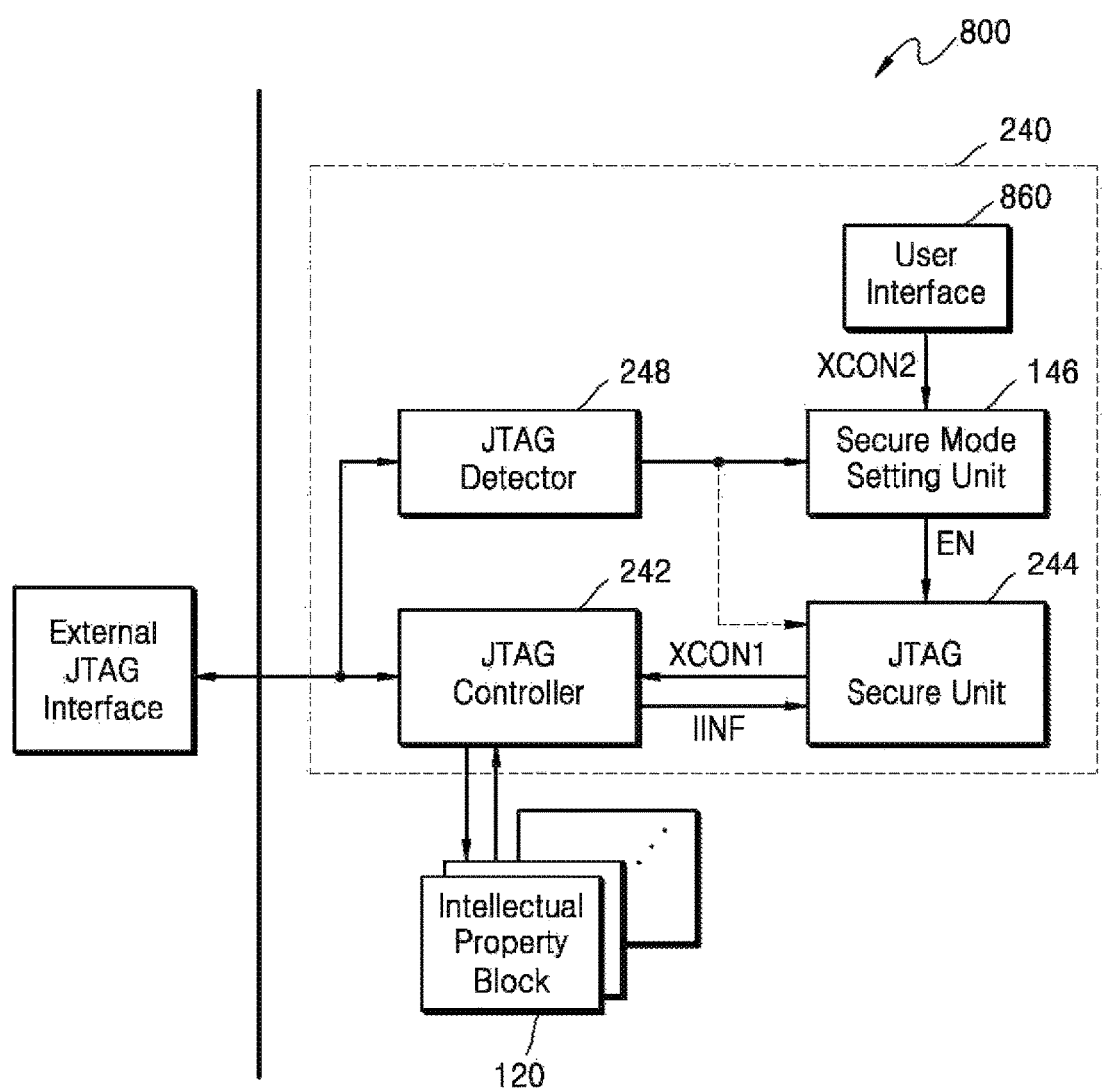

FIGS. 7 and 8 are block diagrams of semiconductor apparatuses according to other exemplary embodiments. First, referring to FIGS. 1 and 7, the semiconductor apparatus 100 of FIG. 1 is provided as a SOC 700, and the debugging processor 140 may be provided as the JTAG port 240, like the embodiment shown in FIG. 4. The JTAG port 240 may include the JTAG controller 242, the JTAG security unit 244, the secure mode setting unit 146, and the JTAG detector 248. The SOC 700 of FIG. 7 may further include a timer 760, and a second control signal XCON2 may be generated by the timer 760 applied to the secure mode setting unit 146. The timer 760 may output the second control signal XCON2 when a reference time has passed after a secure mode is disabled. The reference time may be vary according to a required security level or set by a user. In response to a second control signal XCON2, the secure mode setting unit 146 may convert the SOC 700 from a non-secure mode to the secure mode even though the SOC 700 is not powered off. In the SOC 700, one of the JTAG detector 248 and the timer 760 may generate the second control signal XCON2. Also, the JTAG detector 248 and the timer 760 may generate the second control signal XCON2, respectively.

Referring to FIGS. 1 and 8, the semiconductor apparatus 100 of FIG. 1 may be provided as a SOC 800, and the debugging processor 140 may be provided as the JTAG port 240, like the embodiment shown in FIG. 4. Also, the JTAG port 240 may include the JTAG controller 242, the JTAG security unit 244, the secure mode setting unit 146, and the JTAG detector 248. However, the SOC 800 of FIG. 8 may further include a user interface 860, and a second control signal XCON2 having a second value may be generated by the user interface 860 and applied to the secure mode setting unit 146. A user may set the SOC 800 to a secure mode via the user interface 860. In response to the second control signal XCON2 having the second value, the secure mode setting unit 146 may convert the SOC 800 from a non-secure mode to the secure mode even when the SOC 800 is not powered off. In the SOC 800, one of the JTAG detector 248 and the user interface 860 may generate the second control signal XCON2. Also, the JTAG detector 248 and the user interface 860 may generate the second control signal XCON2, respectively.

Figure 9:
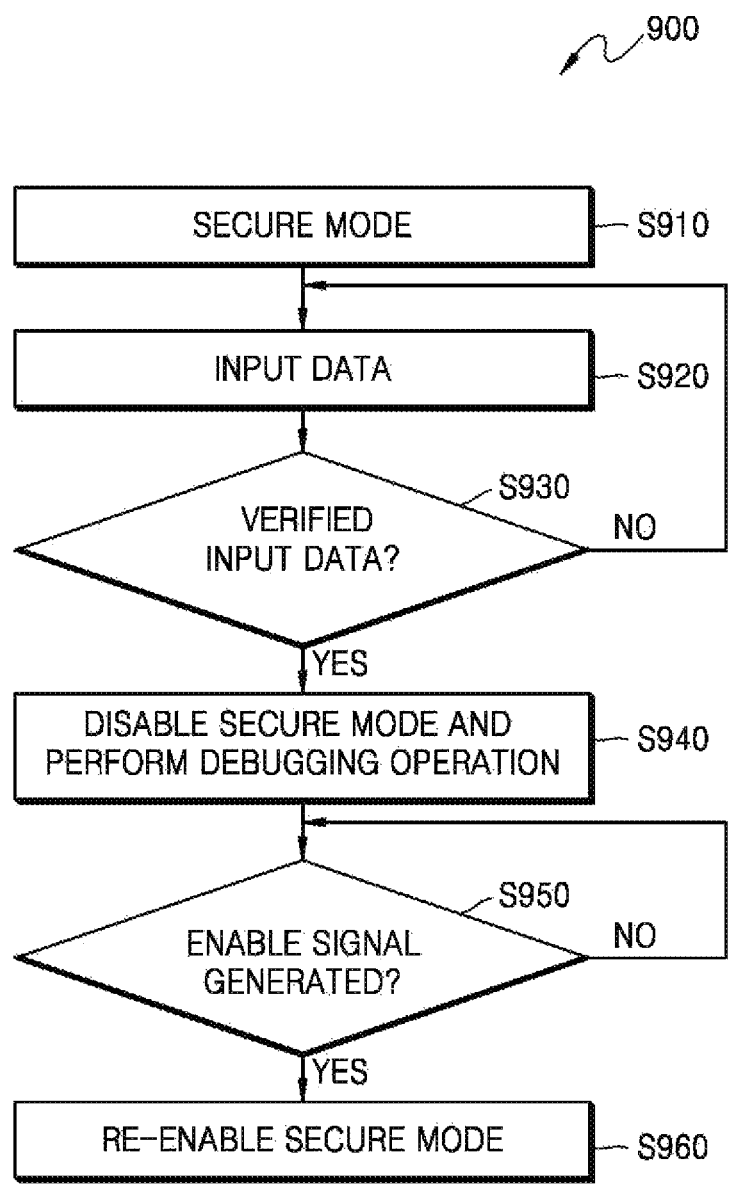
FIG. 9 is a flowchart of a method of operating a semiconductor apparatus, according to an exemplary embodiment.

FIG. 9 is a flowchart of a method 900 of operating a semiconductor apparatus, according to an exemplary embodiment. Referring to FIG. 9, the method 900 of operating the semiconductor apparatus includes inputting input data to the semiconductor apparatus in a secure mode (S910) via a JTAG interface (S920), determining whether the input data is verified input data (S930), if the input data is the verified input data (YES of S930), disabling the secure mode and performing a debugging operation (S940), and when an enable signal is generated (YES of S950), re-enabling (returning to) the secure mode (S960). If the input data is not the verified input data (NO of S930), the secure mode is maintained, and when an enable signal is not generated (NO of S950), a non-secure mode is maintained. The enable signal may be generated by using one selected from the methods described above with reference to FIGS. 4, 7, and 8.

Figure 10:
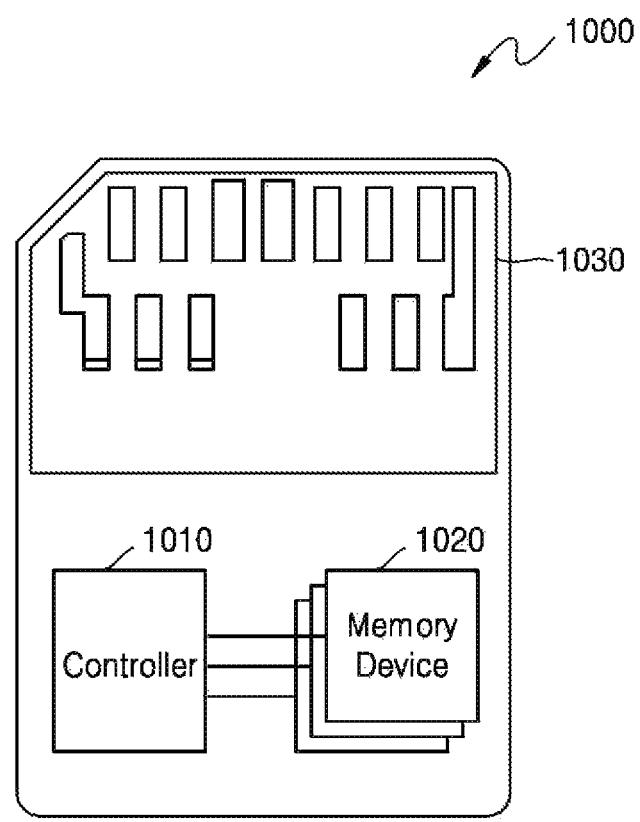
FIG. 10 is a diagram of a memory card according to an exemplary embodiment.

FIG. 10 is a diagram of a memory card 1000 according to an exemplary embodiment. Referring to FIG. 10, the memory card 1000 may be a portable storage device that may be used by connecting to an electronic device such as mobile device or a desktop computer. As shown in FIG. 10, the memory card 1000 may include a memory controller 1010, a memory device 1020, and a port region 1030. The memory card 1000 may communicate with an external host (not shown) via the port region 1030, and the memory controller 1010 may control the memory device 1020. The memory controller 1010 may read a program from ROM (not shown) that stores programs and execute the program. The memory controller 1010 may provide various types of information for controlling a voltage level and/or a voltage increase timing to the memory device 1020. Based on the received information, the memory device 1020 may adjust a timing of increasing a voltage applied to a word line. The memory controller 1010 may be formed as the semiconductor apparatus 100 of FIG. 1. Therefore, the memory card 1000 may have improved security.

Figure 11:
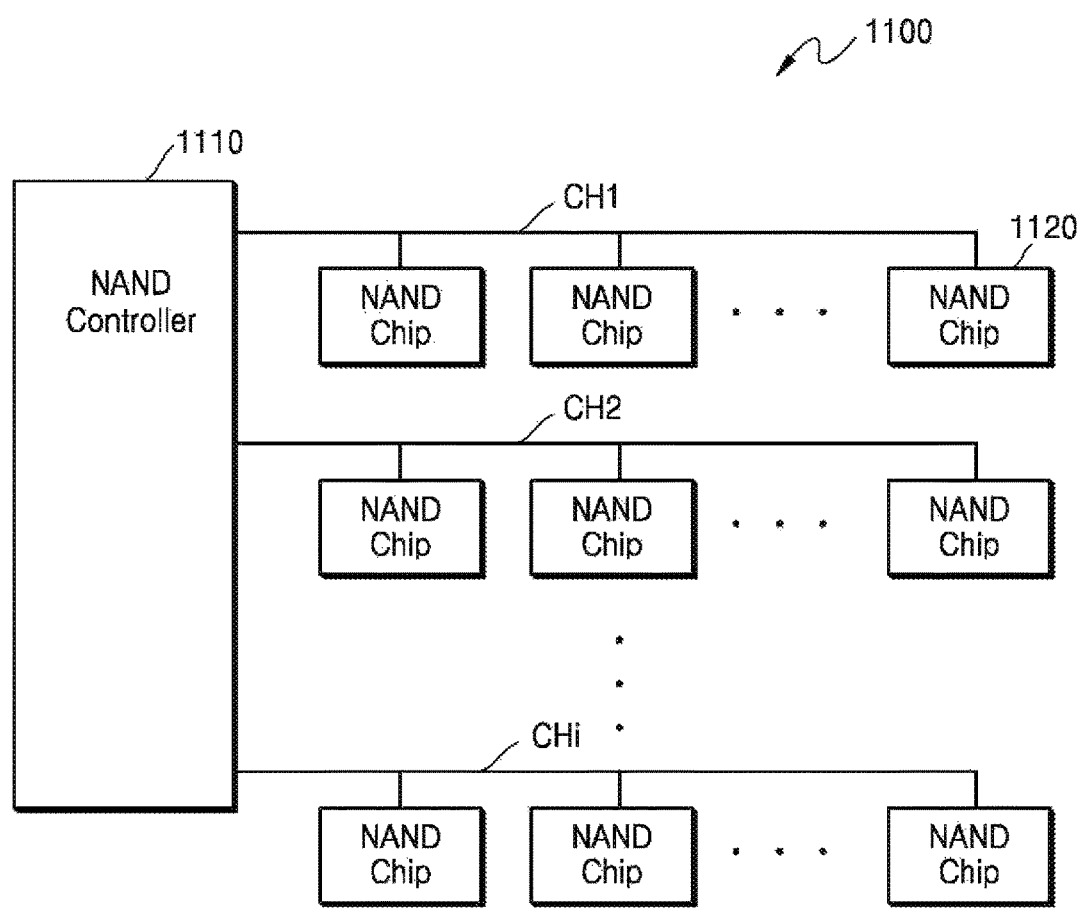
FIG. 11 is a diagram of a solid-state drive (SSD) according to an exemplary embodiment.

FIG. 11 is a diagram of a solid-state drive (SSD) 1100 according to an exemplary embodiment. Referring to FIG. 11, the SSD 1100 according to an exemplary embodiment may include a NAND controller 1110 and a plurality of NAND chips 1120. The NAND controller 1110 may control the plurality of NAND chips 1120 that are connected to channels (CH1, CH2 . . . CHi). The SSD controller 1110 may be formed as the semiconductor apparatus 100 of FIG. 1. Therefore, the SSD 1100 may have improved security.

Figure 12:
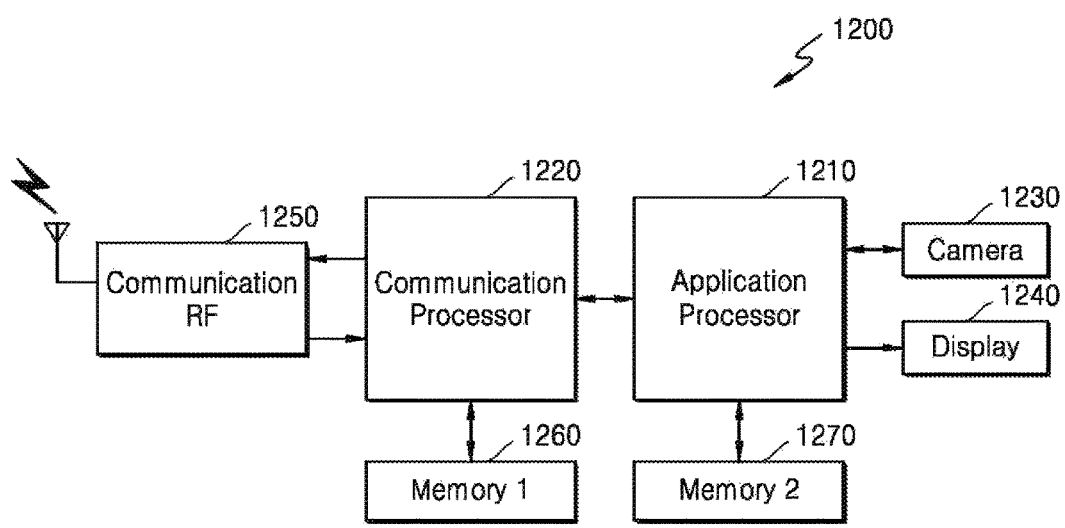
FIG. 12 is a block diagram of a mobile device according to an exemplary embodiment.

FIG. 12 is a block diagram of a mobile device 1200 according to an exemplary embodiment. Referring to FIG. 12, the mobile device 1200 may include an application processor 1210 that is formed as an SOC, a communication processor 1220, a camera 1230, a display 1240, a communication radio frequency (RF) 1250, and first and second memories 1260 and 1270. An application may be executed by the application processor 1210 in the mobile device 1200. For example, when the camera 1230 captures an image, the application processor 1210 may store the captured image in the second memory 1270 and display the captured image on the display 1240. The application processor 1210 may be the semiconductor apparatus 100 of FIG. 1. The captured image may be transmitted to the outside via the communication RF 1250 under the control of the communication processor 1220. The communication processor 1220 may temporarily store the captured image in the first memory 1260 to transmit the captured image. In addition, the communication processor 1220 may control communication for phone calls and data transmission and reception.

Figure 13:
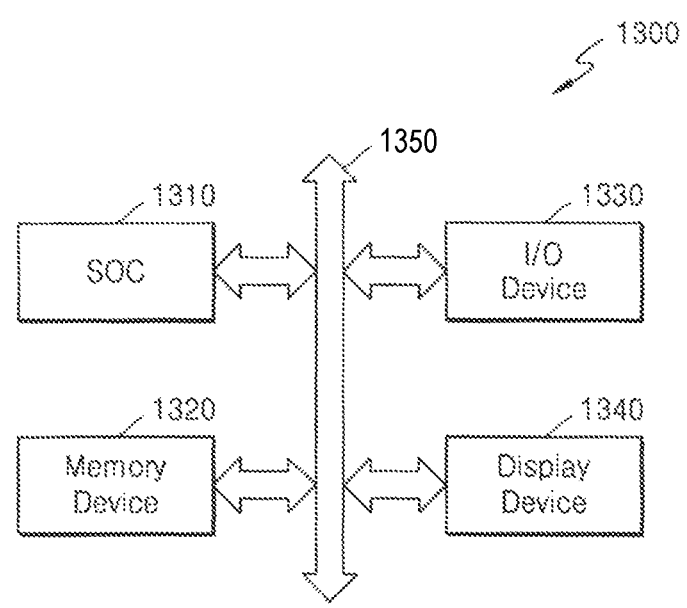
FIG. 13 is a block diagram of a computing system according to an exemplary embodiment.

FIG. 13 is a block diagram of a computing system 1300 according to an exemplary embodiment. Referring to FIG. 13, the computing system 1300, for example, a mobile device, a desktop computer, or a server, may include an SOC 1310, a memory device 1320, an input/output (I/O) device 1330, and a display device 1340. The components described above may be electrically connected to a bus 1350. The SOC 1310 of FIG. 13 may be the semiconductor apparatus 100 of FIG. 1.

While the inventive concept has been particularly shown and described with reference to exemplary embodiments thereof, it will be understood that various changes in form and details may be made therein without departing from the spirit and scope of the following claims.

What is claimed is:
1. A semiconductor apparatus comprising:
a plurality of intellectual property (IP) blocks; and
a debugging processor configured to perform a debugging operation related to at least one IP block selected from among the plurality of IP blocks,
wherein the debugging processor comprises
a debugging executer configured to disable a secure mode when input data is verified data, and to perform the debugging operation related to the at least one IP block based on the input data, and
a secure mode setter configured to generate an enable signal for instructing re-enabling of the secure mode, wherein the secure mode is re-enabled without powering off the semiconductor apparatus.

2. The semiconductor apparatus of claim 1, wherein the debugging executer is configured to receive the input data via a Joint Test Action Group (JTAG) interface.

3. The semiconductor apparatus of claim 1, wherein in the secure mode, the debugging executer is configured to output a null value in response to the input data.

4. The semiconductor apparatus of claim 1, wherein the debugging processor further comprises a Joint Test Action Group (JTAG) detector configured to detect whether the debugging processor is connected with an external device via a JTAG interface.

5. The semiconductor apparatus of claim 4, wherein the secure mode setter is configured to generate the enable signal in response to a first signal which indicates that the debugging processor and the external device are disconnected.

6. The semiconductor apparatus of claim 1, further comprising a timer configured to check a time elapsed from a time point at which the secure mode was disabled, and
wherein the secure mode setter is configured to generate the enable signal in response to a control signal which indicates that more than a reference time has elapsed from the time point when the secure mode was disabled.

7. The semiconductor apparatus of claim 1, further comprising a user interface, and
wherein the secure mode setter is configured to generate the enable signal in response to a control signal which indicates that a user setting is input via the user interface.

8. The semiconductor apparatus of claim 1, further comprising a debugging securer configured to generate a first control signal having a first value when the input data is verified data, and to generate the first control signal having a second value, which is different from the first value, when the enable signal is generated after the secure mode is disabled,
wherein the debugging executer is responsive to the first control signal having the first value to disable the secure mode, and
wherein the debugging securer is configured to determine whether the input data is the verified data based on identification information input via a Joint Test Action Group (JTAG) interface.

9. The semiconductor apparatus of claim 1, wherein the semiconductor apparatus is a system on chip (SoC).

10. A semiconductor apparatus comprising:
a plurality of intellectual property (IP) blocks; and
a Joint Test Action Group (JTAG) port configured to perform a debugging operation related to at least one IP block selected from among the plurality of IP blocks,
wherein the JTAG port comprises
a JTAG controller configured to disable a secure mode in response to a first control signal having a first value and to perform the debugging operation related to the at least one IP block based on input data, and
a JTAG securer configured to generate the first control signal having the first value when the input data is verified data, and to generate the first control signal having a second value, which is different from the first value, instructing re-enabling of the secure mode, wherein the secure mode is re-enabled without powering off the semiconductor apparatus.

11. The semiconductor apparatus of claim 10, further comprising a secure mode setter configured to generate an enable signal for instructing re-enabling of the secure mode, in response to a second control signal.

12. The semiconductor apparatus of claim 11, wherein the JTAG port comprises the secure mode setter.

13. The semiconductor apparatus of claim 11, wherein the JTAG port further comprises a JTAG detector configured to detect whether the JTAG port is connected with an external device via a JTAG interface.

14. The semiconductor apparatus of claim 13, wherein the secure mode setter is configured to generate the enable signal in response to the second control signal which indicates that the JTAG port and the external device are disconnected.

15. The semiconductor apparatus of claim 11, further comprising a timer that checks a time elapsed from a time point at which the secure mode was disabled, and wherein the secure mode setter is configured to generate the enable signal in response to the second control signal which indicates that more than a reference time has elapsed from the time point when the secure mode was disabled.

16. The semiconductor apparatus of claim 11, further comprising a user interface, and wherein the secure mode setter is configured to generate the enable signal in response to the second control signal which indicates that a user setting is input via the user interface.

17. The semiconductor apparatus of claim 10, wherein the JTAG securer is configured to determine whether the input data is the verified data based on identification information input via a JTAG interface.

18. The semiconductor apparatus of claim 10, wherein the semiconductor apparatus is a system on chip (SoC).

19. A method of operating a semiconductor apparatus, the method comprising:

operating in a secure mode;

inputting input data via a Joint Test Action Group (JTAG) interface;

determining whether the input data is verified input data;

disabling the secure mode when the input data is the verified input data and performing a debugging operation related to at least one intellectual property (IP) block selected from among a plurality of IP blocks based on the input data; and re-enabling the secure mode without powering off the semiconductor apparatus, wherein the re-enabling the secure mode is performed upon determination that an external device is disconnected from the semiconductor apparatus via the JTAG interface.

20. The method of claim 19, wherein the re-enabling the secure mode is also performed when a reference time has elapsed from a time point when the secure mode was disabled.

* * * * *